United States Patent

[11] 3,552,444

| [72] | Inventor | George Napoleon Levesque<br>Warwick, R.I. |
|---|---|---|
| [21] | Appl. No. | 817,701 |
| [22] | Filed | Apr. 21, 1969 |
| [45] | Patented | Jan. 5, 1971 |
| [73] | Assignee | Brown & Sharpe Manufacturing Company<br>North Kingstown, R.I.<br>a corporation of Delaware |

[54] VARIABLE THROTTLE VALVE FOR LOGIC APPLICATIONS
5 Claims, 7 Drawing Figs.

[52] U.S. Cl. .................................................... 138/43, 138/46, 137/625.3
[51] Int. Cl. .................................................... F15d 1/02
[50] Field of Search .......................................... 138/43, 46; 137/525, 625.3

[56] References Cited
UNITED STATES PATENTS

| 2,289,905 | 7/1942 | Dasher | 138/43X |
| 2,508,793 | 5/1950 | Miller | 138/43 |
| 2,511,733 | 6/1950 | Morrison | 138/43 |
| 2,554,790 | 5/1951 | Miller | 138/43 |

Primary Examiner—Herbert F. Ross
Attorney—Martin Kirkpatrick

ABSTRACT: The disclosure of the invention is a variable throttle valve which consists of two cooperating valve elements having oppositely disposed relatively diverging surfaces, at least one of which is an elastomer, one of said surfaces having a spiral capillary restrictor groove, and means for relatively moving said surfaces toward and away from one another to control the effective length of said spiral capillary restrictor groove.

PATENTED JAN 5 1971  3,552,444

VARIABLE THROTTLE VALVE FOR LOGIC APPLICATIONS

The present invention relates to a variable throttle valve, and more particularly to such a valve adapted for controlling and for adjusting small flows for logic and similar applications.

For use in such applications in which a great many logic control devices may be mounted as a unit within a relatively small control panel, it is of considerable importance that each of said devices including the variable throttle valve herein disclosed should be made as simple and compact as possible and that adjustments of the valve setting be made with a minimum displacement of the valve parts.

It is, accordingly, an object of the invention to provide an improved throttle valve suitable for logic applications which is capable of accurately controlling said flows, is simple and compact in construction, and is well adapted to produce any desired rate of flow within acceptable limits with no more than a minimum displacement of the valve parts.

With the foregoing and other objects in view as may hereinafter appear the several features of the invention and the advantages to be obtained thereby will be readily appreciated by one skilled in the art from the following description taken in connection with the accompanying drawings, in which FIG. 1 is a view in side elevation of the improved variable throttle valve;

Figure 1:
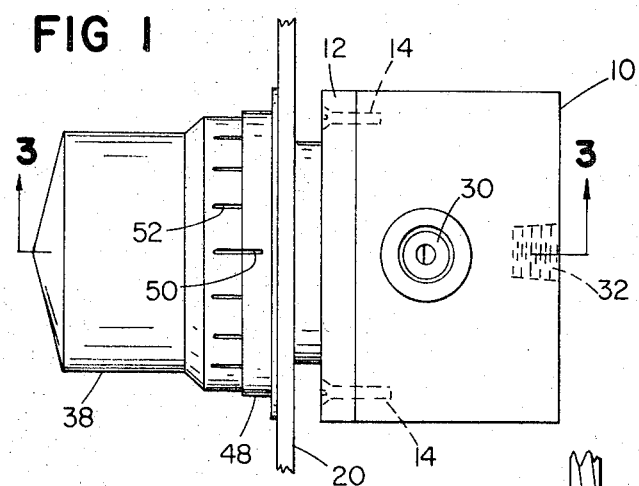
Figure 2:
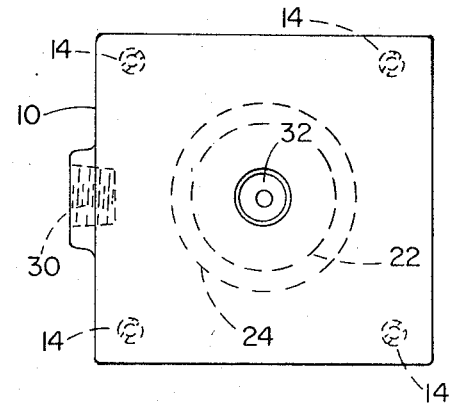
FIG. 2 is an end view looking from the right of the variable throttle valve shown in FIG. 1.
Figure 3:
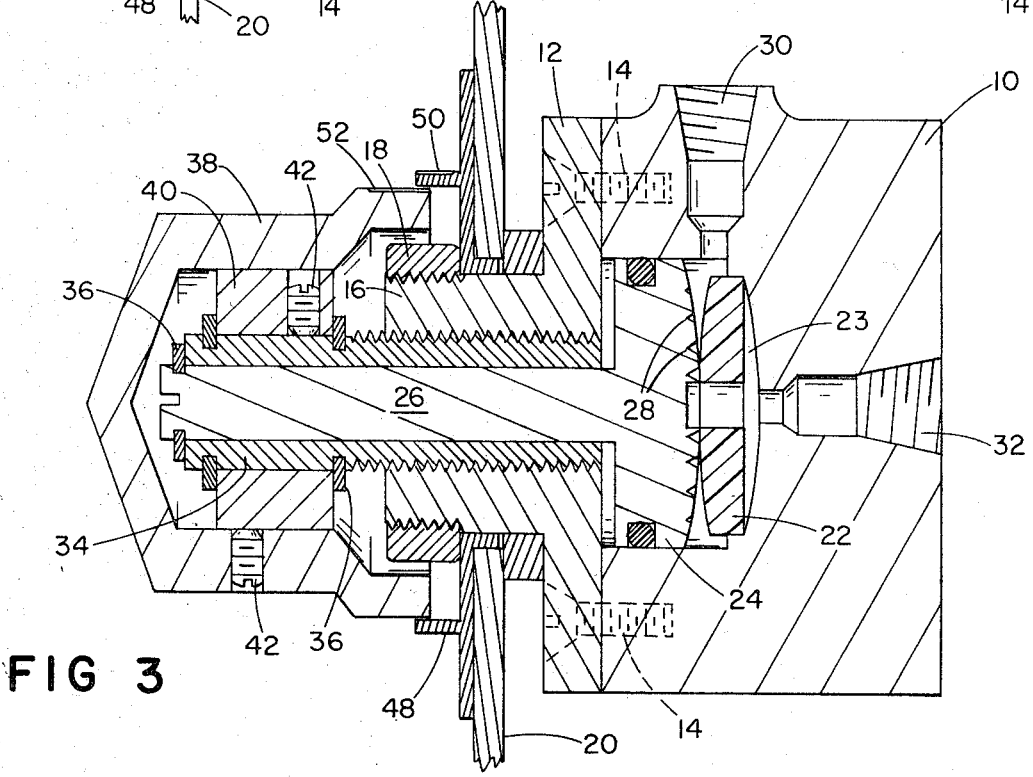
FIG. 3 is a section taken on a line 3-3 of FIG. 1.
Figure 4:
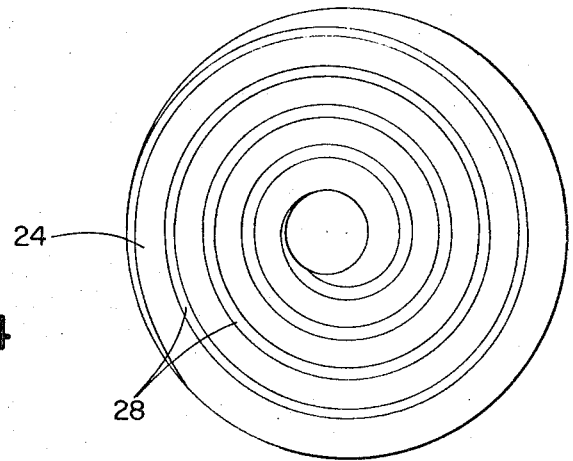
FIG. 4 is a somewhat fragmentary detail end view looking from the right of the movable valve element illustrating particularly the spiral V-shaped restrictor groove formed in the face of said valve element.
Figure 5:
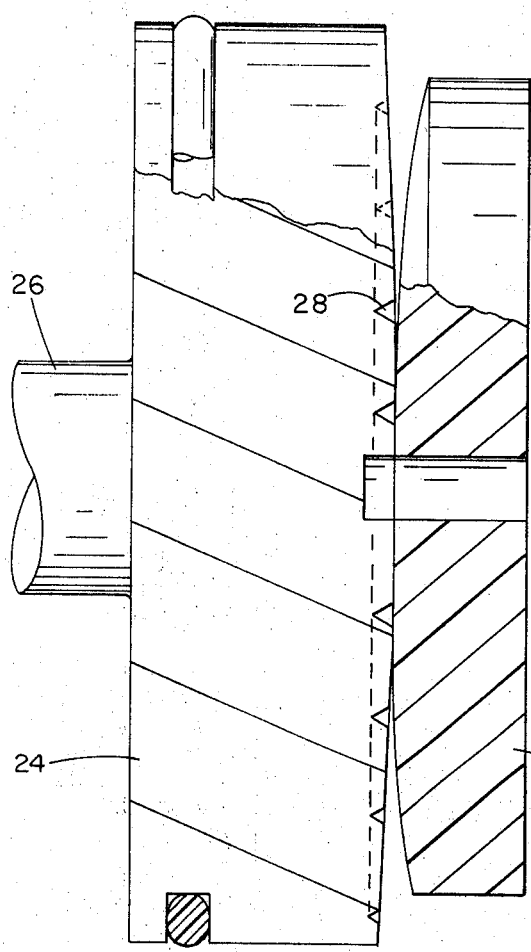
FIG. 5 is a fragmentary enlarged view in side elevation illustrating portions of the elastomer and movable valve element having the grooved face engaged against said elastomer.

The variable throttle valve illustrated as embodying in a preferred form the several features of the invention comprises generally two cooperating valve elements relatively movable toward and away from one another, having oppositely disposed slightly diverging surfaces at least one of which is an elastomer, a spiral capillary restrictor groove formed between said surfaces, and means for adjusting said surfaces toward and away from one another to control the effective length of said capillary restrictor groove.

Referring specifically to the drawings the variable throttle valve disclosed comprises a valve body 10 having a body cover 12 attached thereto by four cover screws 14. The body cover 12 is formed with a centrally located outwardly extending sleeve 16 externally threaded to receive a locknut 18 by means of which the entire valve assembly is rigidly secured to a panel casing generally indicated at 20.

The valve body 10 houses a disc-shaped elastomer 22 and a cooperating disc-shaped adjustable throttle valve element 24 which is engaged against the elastomer 22 and is formed with a stem 26 mounted coaxially within the body cover sleeve 16. The outward face of the elastomer is flat and is opposite a recess 23 in the body 10 which permits displacement of the elastomer, while the inward face adjacent the adjustable valve element 24 is slightly convex. The face of the adjustable valve element and the face of the elastomer engaging therewith diverge from one another toward their outer edges. A spiral V-shaped restrictor groove 28 formed in the convex face of the adjustable valve element 24 provides a passageway through which a flow of air is directed from an air inlet 30 in the valve body through the spiral restrictor groove 28 to an air outlet connected with the inner end of the groove. With this arrangement, a very slight movement of the adjustable throttle valve element 24 against the elastomer 22 will cause the elastomer to be compressed so that a larger area of the opposed face of the throttle valve element 24 is engaged to increase the length of restrictor groove enclosed by the elastomer and to correspondingly reduce the flow of air through the restrictor groove. Conversely, a very slight movement of the adjustable throttle valve element 24 away from the elastomer 22 will reduce the area of contact between the throttle valve element and elastomer to shorten the length of restrictor groove enclosed by the throttle valve element with a corresponding increase in the rate of flow through the restrictor groove.

The V-shaped restrictor groove can be formed more shallow toward the outer edge to obtain better control of the higher rates of flow and still retain a wide range of adjustment. When this is done the grooved element can be made slightly convex so that the groove can be cut on conventional lathe equipment and still have the varying groove depth. If only a modest range of adjustment is required, such as a 20 to 1 range, the groove depth can be constant and the face of the grooved element could be flat with all of the convex shape being on the opposing element.

Mechanism is provided for imparting a limited in and out movement to the valve element 24 toward and away from the elastomer 22 to control the effective length of the restrictor groove 28, which comprises an adjusting sleeve 34 rotatably mounted on the stem 26 of the adjustable valve member 24 and internally of the cover sleeve 16 between the adjacent face of the valve member 24 and a snap ring 36. The adjusting sleeve 34 is externally threaded into the sleeve 16 forming part of the cover 12, and is fitted with a manually operable knob 38 held in place by a spacer 40 and set screws 42. An indicator cup 48 secured to the panel casing 20 to overlay the edge of the knob 38 has formed thereon an indicating line 50 which cooperates with a series of graduations 52 on the knob 38 which are calibrated to indicate the amount of compression to which the elastomer is subjected, the effective length of the spiral restrictor groove 28, and the corresponding rate of flow through the throttle valve.

Figure 6:
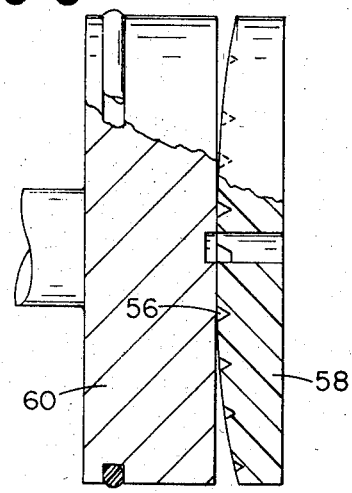
FIG. 6 is a fragmentary view similar to FIG. 5, but on a smaller scale, in which the restrictor groove is formed in the elastomer.
Figure 7:
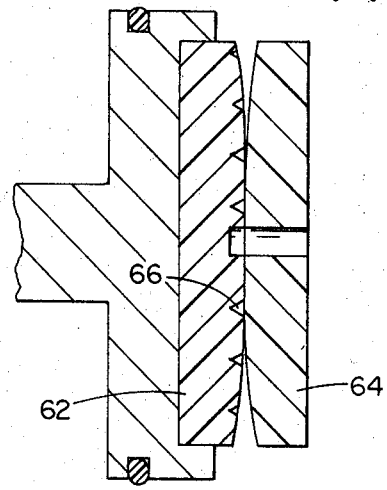
FIG. 7 is a fragmentary view similar to FIG. 5, in which both valve elements are shown as elastomers.

It is contemplated that various modifications may be made in the construction and design of the variable throttle valve herein disclosed within the spirit and scope of the invention. Two such modifications are shown in FIGS. 6 and 7 of the drawings. FIG. 6 is a fragmentary illustration of a variable throttle valve similar to that previously described in which the restrictive groove, designated at 56, is formed in the elastomer 58 instead of being formed in the face of the adjustable valve element which is here given the designation 60.

FIG. 7 is a fragmentary illustration of a variable throttle valve similar to that shown in FIGS. 1 to 5 in which both of the relatively adjustable valve elements, designated respectively at 62 and 64, are elastomers having engaging surfaces which diverge from one another toward the edges. The restrictor groove, designated at 66, is formed in the movable valve element 62. As in the previously described embodiments of the invention, movement of the valve elements relatively together produces a deformation of the engaging surfaces which causes the effective length of the enclosed restrictor groove 66 to be increased and the size to be reduced, thereby effecting a corresponding reduction in the rate of flow of air through the valve.

I claim:

1. A variable throttle valve having, in combination, two cooperating valve elements having oppositely disposed diverging surfaces, at least one of said elements being an elastomer, and a spiral capillary restrictor groove formed in one of said diverging surfaces having an effective length determined by the length of closure of said groove by the diverging surface of the other said valve element, and adjusting means for relatively moving said valve elements including said diverging surfaces toward and away from each other to vary the effective length of said spiral capillary restrictor groove.

2. A variable throttle valve according to claim 1, in which one of said cooperating relatively adjustable valve elements is formed of a hard nonyielding material, the other of said cooperating relatively adjustable valve elements is an elastomer, and a restrictor groove is formed in the engaging surface of one of said cooperating relatively adjustable valve elements.

3. A variable throttle valve according to claim 2, in which the restrictor groove is formed in the engaging surface of that valve element which is formed of a hard nonyielding material.

4. A variable throttle valve according to claim 2, in which the restrictor groove is formed in the elastomer.

5. A variable throttle valve according to claim 1, in which both of said cooperating relatively adjustable valve elements are elastomers, the restrictor groove being formed in the diverging surface of one of said elastomers.